UNITED STATES PATENT OFFICE 2,615,798

EXTRACTION OF CERIUM WITH AN ORGANIC SOLVENT

Edgar C. Pitzer, Schenectady, N. Y., assignor to the United States of America as represented by the United States Atomic Energy Commission No Drawing. Application March 6, 1951, Serial No. 214,204

12 Claims. (Cl. 23—312)

This invention deals with the extraction of cerium cations from aqueous solutions with an organic solvent and in particular with the extraction of cerium values present in tracer concentration by means of a water-immiscible aliphatic ketone.

It is an object of this invention to provide a process by which the extraction of cerium is considerably increased.

It has been found that the presence of dichromate in the aqueous cerium salt solution, and in particular the concentration in which the dichromate is present, critically influences the degree of solvent extraction of cerium values dissolved in tracer concentration when substantially water-immiscible aliphatic ketones are used as the solvent.

Experiments showed that the function between dichromate concentration and extractability is quite complex and by no means directly proportional. It was found that a critical range of dichromate concentration exists in which a maximum extraction is obtained.

This unexpected relationship between dichomate concentration and extraction coefficient will be better obvious from the tests compiled in the table below. In all of these tests aqueous solutions were used which had a concentration of $Ce^{+++}$ of $7 \times 10^5$ counts/min./ml., furthermore containing aluminum nitrate in a concentration of 1.2 M and nitric acid in a concentration of 0.15 M, but having varying concentrations of sodium dichromate. The extractions were carried out in each instance at room temperature with methyl isobutyl ketone (hexone) which was 0.5 M in nitric acid.

Table

| $Na_2Cr_2O_7$ (M) | Extraction coefficient (organic/aqueous) |
|---|---|
| 0 | ~0 |
| 0.0001 | $5 \times 10^{-4}$ |
| 0.0005 | 1.21 |
| 0.001 | 1.48 |
| 0.0015 | 3.20 |
| 0.0025 | 3.25 |
| 0.005 | 2.11 |
| 0.0075 | 1.37 |
| 0.01 | 1.03 |
| 0.05 | 0.34 |
| 0.1 | 0.20 |

From the values obtained in the above tests, and still better from a curve plotted from these values, it is obvious that the concentration of dichromate is critical and that, in order to obtain a satisfactory cerium extraction, the dichromate concentration should be maintained at between 0.0004 and 0.01 M but preferably between 0.001 and 0.005 M.

The extraction of the cerium values is furthermore improved by adding a salting-out agent to the aqueous solution. Water-soluble substances which have an anion in common with the salt to be extracted, such as acids or salts, are particularly suitable. In case that cerium is present in the form of cerous nitrate, for instance, nitric acid, alkali nitrates including ammonium nitrate, alkaline earth metal nitrates, aluminum nitrate, chromium nitrate and ferric nitrate are suitable. The extraction is increased with an increase of salting-out agent concentration.

Although the salting-out agents may be neutral salts, it has been found that the extraction is still furthermore improved if it is carried out from a mineral acid aqueous solution; also in this case the efficiency is higher with higher acid concentration.

Hexone (methyl isobutyl ketone) is the preferred substantially water-immiscible aliphatic ketone. Also the ketone is preferably used in acid condition, and a mineral acid concentration of from 0.1 to 1 N is preferred for this purpose.

It will be understood that by applying a number of extraction stages, the total yield, or separation, may be considerably increased.

The solvent may be reconditioned for re-use by back-extracting the cerium values with a suitable aqueous solution, a means known to those skilled in the art. For instance, an aqueous, alkali-containing solution for the purpose of neutralizing the acid in the solvent is satisfactory for the back-extraction of the cerium. Another solution suitable for stripping is an aqueous solution containing a reducing agent such as hydrogen peroxide or ferrous salts by which the tetravalent cerium is reduced to the nonextractable trivalent cerium. Moreover, the teaching of this invention may be utilized for the back-extraction, namely, by using a dichromate solution of a concentration outside the critical range, for instance a dichromate solution of at least 0.05 M.

It will be understood that this invention is not to be limited to the details given herein but that it may be modified within the scope of the appended claims.

What is claimed is:

1. A process for the separation of cerium values from an aqueous solution containing cerium nitrate in a tracer concentration, comprising incorporating an alkali metal dichromate to obtain a concentration of from 0.0004 to 0.01 M, contacting the resultant aqueous solution with a substantially water-immiscible aliphatic ketone, and separating an aqueous phase and a ketone extract phase containing cerium values.

2. A process for the separation of cerium values from an aqueous solution containing cerium nitrate in a tracer concentration, comprising adding a salting-out agent to said solution, incorporating an alkali metal dichromate to obtain a concentration of from 0.0004 to 0.01 M, contacting the resultant aqueous solution with a substantially water-immiscible aliphatic ketone, and separating an aqueous phase and a ketone extract phase containing cerium values.

3. The process of claim 2 wherein the aqueous solution is a mineral acid solution.

4. The process of claim 2 wherein the dichromate concentration ranges between 0.0005 to 0.005 M.

5. The process of claim 2 wherein the dichromate is sodium dichromate.

6. The process of claim 2 wherein the salting-out agent is a mixture of aluminum nitrate and nitric acid.

7. The process of claim 2 wherein the ketone is hexone.

8. The process of claim 2 wherein the ketone is acidified hexone.

9. The process of claim 2 wherein the aqueous solution is a nitric acid solution and the ketone is hexone containing nitric acid.

10. The process of claim 9 wherein the hexone contains nitric acid in a concentration of from 0.1 to 1 M.

11. The process of claim 2 wherein the aqueous solution contains 1.2 M aluminum nitrate and 0.15 M nitric acid and the ketone is hexone containing 0.5 M nitric acid.

12. The process of claim 11 wherein the dichromate concentration ranges from 0.001 to 0.005 M.

EDGAR C. PITZER.

REFERENCES CITED

The following references are of record in the file of this patent:

Bock et al., Uber die Verteilung von Nitraten Seltener Erden zwischen wasrigen Losungen und organischen Losungsmitteln, Naturwissenschaften 36, page 344 (1949).